United States Patent [19]

Kaplan et al.

[11] Patent Number: 4,558,839
[45] Date of Patent: Dec. 17, 1985

[54] FACTORY DATA COLLECTION TERMINAL MOUNTED TO A VERTICAL SURFACE BY A QUICK DISCONNECT WALL BRACKET

[75] Inventors: Jay Kaplan, Wayland; Ray Marchant, Westboro, both of Mass.

[73] Assignee: Honeywell Information Systems Inc., Waltham, Mass.

[21] Appl. No.: 737,894

[22] Filed: May 23, 1985

Related U.S. Application Data

[63] Continuation of Ser. No. 277,780, Jun. 26, 1981, abandoned.

[51] Int. Cl.[4] .............................................. F16M 13/00
[52] U.S. Cl. ..................................... 248/542; 248/223.1
[58] Field of Search .................. 248/542, 222.4, 222.1, 248/223.1, 223.3, 309.1, 311.2, 223.2; 312/319, 242; 339/125 R

[56] References Cited

U.S. PATENT DOCUMENTS

| | | | |
|---|---|---|---|
| 1,898,835 | 2/1933 | Henderson | 248/222.1 |
| 2,605,921 | 8/1952 | Johnson | 33/180 |
| 2,831,808 | 4/1958 | Esseff | 248/223.4 |
| 2,859,710 | 11/1958 | Elsner | 248/223.4 |
| 3,159,368 | 12/1964 | Ahlbin | 248/222.4 |
| 3,319,060 | 5/1967 | Bartley | 248/222.1 |
| 4,121,495 | 10/1978 | Malo | 248/223.2 |
| 4,165,092 | 8/1979 | Herlein | 248/222.1 |
| 4,428,596 | 1/1984 | Bell | 248/222.1 |

FOREIGN PATENT DOCUMENTS 173271 7/1906 Fed. Rep. of Germany ... 248/222.1

Primary Examiner—Reinaldo P. Machado
Assistant Examiner—Alvin Chin-Shue
Attorney, Agent, or Firm—George Grayson; John S. Solakian

[57] ABSTRACT

A mounting bracket system mounts a factory data collection terminal vertically to a wall to secure the terminal rigidly to the wall surface and also to permit a quick disconnect of the terminal. This is accomplished by fastening two brackets with keyhole slots which are attached to the upper area of the terminal and using two spring loaded captive fasteners which are accessible from the front of the terminal and attached to the bottom of the terminal.

6 Claims, 3 Drawing Figures

FACTORY DATA COLLECTION
TERMINAL 2

FACTORY DATA COLLECTION TERMINAL MOUNTED TO A VERTICAL SURFACE BY A QUICK DISCONNECT WALL BRACKET

RELATED APPLICATIONS

This application is a continuation of application Ser. No. 277,780 filed June 26, 1981 now abandoned.

The following U.S. patent applications filed on an even date with the instant application and assigned to the same assignee as the instant application are related to the instant application and are incorporated herein by reference.

1. "Remote Terminal Address and Baud Rate Selection" by Jay Kaplan, Richard G. Harris, and Barry Sidebottom, filed on June 26, 1981 and having U.S. Ser. No. 277,783 which was abandoned and a continuation filed on Oct. 31, 1984, having U.S. Ser. No. 665,511.
2. "Factory Data Collection Terminal Conduit Enclosure" by Jay Kaplan and Ray Marchant, filed on June 26, 1981 and having U.S. Ser. No. 277,784 which issued as U.S. Pat. No. 4,493,524 on Jan. 15, 1985.

BACKGROUND OF THE INVENTION

1. Field of the Invention

The invention relates generally to a factory data collection terminal and more specifically to the mounting of the terminal to a vertical wall in a dirty factory environment.

2. Description of the Prior Art

The normal factory environment is noisy and dirty. Many factories use heavy machinery which causes the walls to vibrate. Factory data collection terminals are being used more and more in factories. These terminals are connected to a data processing unit via a direct connect cable and are used by factory personnel to input data into the terminal.

The prior art terminals are mounted to the vertical wall by removing the outer cover and inserting and tightening the bolts. Periodically, due to vibration, the terminal vibrates due to the loosening of the bolts. This again requires the removal of the outer cover to tighten the bolts. Removing the cover in a factory environment invites problems due to the dirt and the rough handling of the inner mechanism by factory personnel.

OBJECTS OF THE INVENTION

Accordingly, it is an object of the invention to provide an improved data collection terminal.

It is another object of the invention to provide a data collection terminal that may be mounted to a vertical wall without removing the cover.

It is still another object of the invention to provide a data collection unit that can be readily disconnected from a vertical wall.

It is yet another object of the invention to provide a data collection terminal whereby the effect of wall vibration on the terminal is minimized.

SUMMARY OF THE INVENTION

A mounting bracket system for a factory data collection terminal mounted on a vertical wall includes a terminal backplate with two brackets with keyhole slots fastened to the upper portion of the backplate. Fastened to the vertical wall is a wall bracket having two studs. A nut, a lock washer and a washer are mounted on the studs. The terminal is placed so that the large diameter of the keyhole slot passes over the stud stop.

A pair of captive fasteners attached to the lower portion of the terminal backplate are screwed into the wall bracket tapped holes until a coil spring mounted on the fastener is fully compressed between a threaded collar fastened to the terminal backplate and the fastener head.

The stud nut is tightened to force the terminal backplate against the stud stop thereby preventing wall vibration from loosening the terminal from the bracket.

The terminal is readily removed by loosening the stud nut and unscrewing the captive fasteners until they "pop out" due to the spring tension. This assures that the terminal is completely unfastened from the wall bracket and may be lifted from the studs thereby reducing the possibility of damage to the terminal by slipping from ones hands if it were lifted from the studs with a few threads of one of the captive screws still engaged with the threaded hole in the wall bracket.

BRIEF DESCRIPTION OF THE DRAWINGS

The novel features which are characteristic of the invention are set forth with particularity in the appended claims. The invention itself, however, both as to organization and operation may best be understood by reference to the following description in conjunction with the drawings in which:

DESCRIPTION OF THE PREFERRED EMBODIMENT

Figure 1:
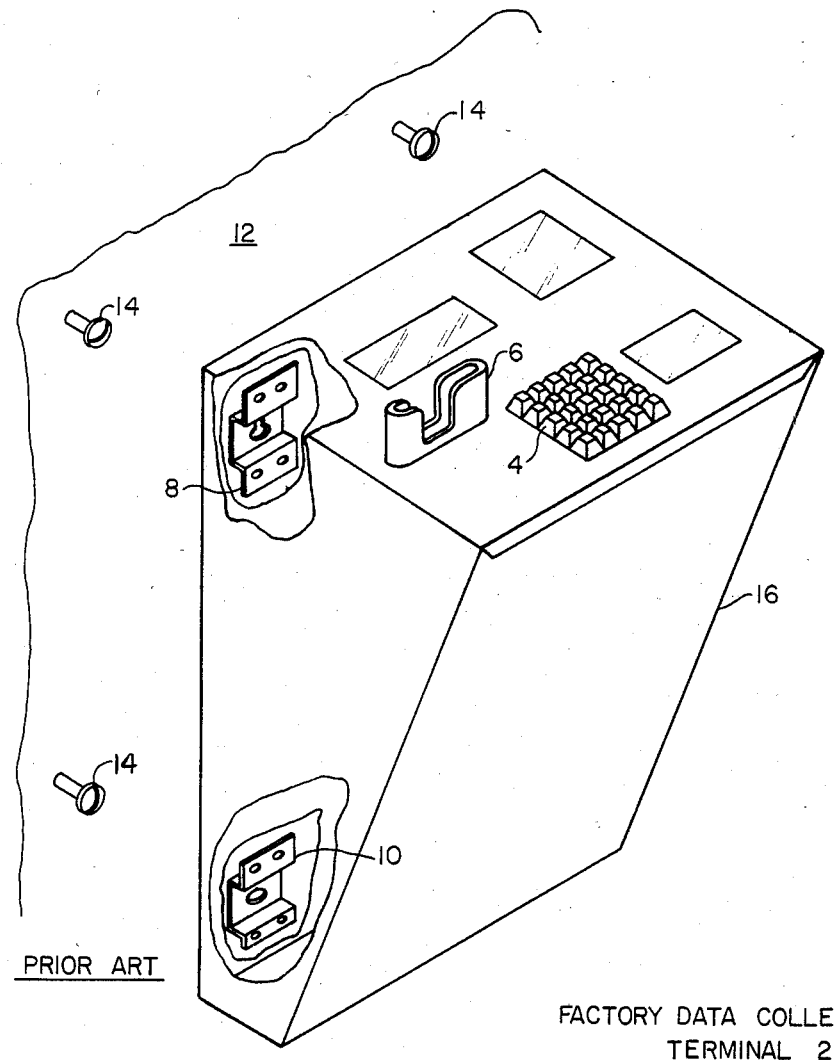
FIG. 1 shows the prior art factory data collection terminal.

FIG. 1 shows the factory data collection terminal 2 including a keyboard 4, a slot 6 for the insertion of a plastic identification card, a pair of brackets 8 fastened over the top of the terminal 2 (only one of the two brackets 8 is shown) and a pair of brackets 10 fastened near the bottom of the prior art terminal 2 (only one of the two brackets 10 is shown). The prior art terminal 2 is usually mounted to a vertical wall or post 12 in a factory by four bolts 14 screwed into the wall or post 12. Access to the bolts 14 for tightening is made by removing a cover 16 from terminal 2.

Figure 2:
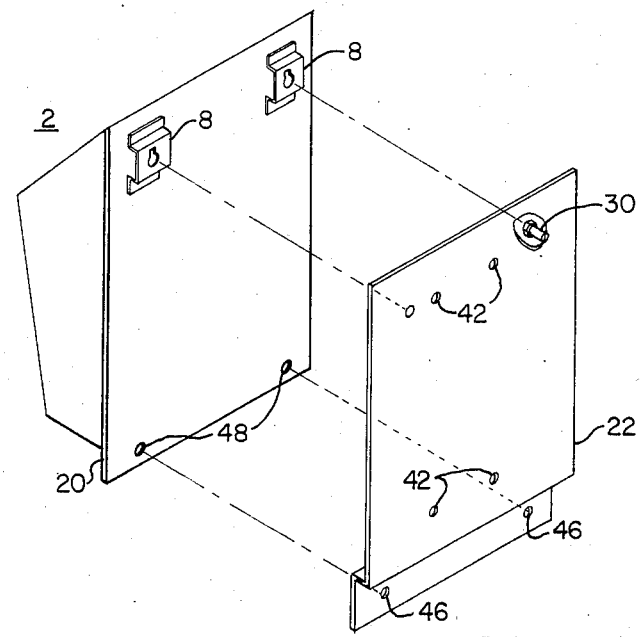
FIG. 2 shows the terminal mounting elements.

FIG. 2 shows the improved mounting apparatus. The terminal 2 includes a terminal backplate 20 to which brackets 8 are fastened. A wall bracket 22 is fastened to the vertical wall or post 12. Two studs 30 (only one is shown in FIG. 2) are pressed into wall mounting bracket 22.

Figure 3:
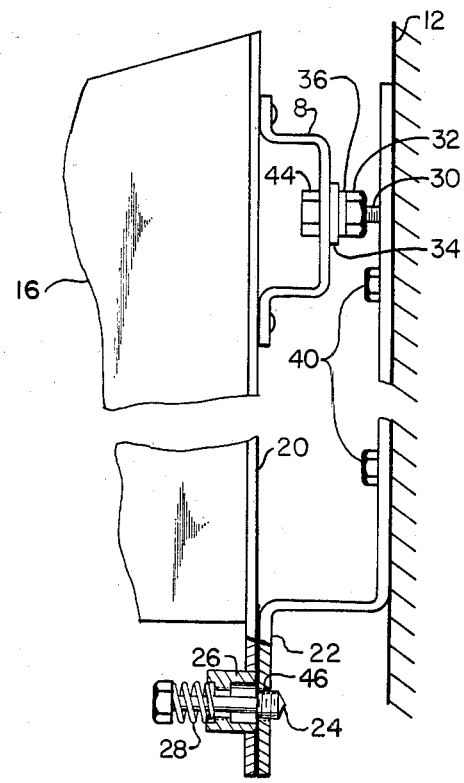
FIG. 3 is an assembly drawing showing the mounting details.

FIG. 3 shows the means by which terminal 2 is fastened to vertical wall or post 12. Wall mounting bracket 22 is fastened to vertical wall or post 12 by typically four screws 40 through four holes 42 (see FIG. 2). The stud 30 includes a stop 44 welded to it. A washer 34, a lock washer 36, and a nut 32 are mounted onto stud 30.

Terminal 2 is mounted to wall mounting bracket 22 by placing stop 44 through the large diameter hole of the keyhole opening in both brackets 8 and lowering terminal 2 so that the small diameter hole of brackets 8 rests on stud 30. Nut 32 is tightened forcing terminal backplate 20 against stop 44 to prevent terminal 2 from vibrating in its normal factory environment.

The bottom of terminal 2 is fastened to wall mounting bracket 22 via two screws 24. Screw 24 includes a threaded portion and an unthreaded portion. The threaded portion is screwed completely through the threaded hole of a collar 26 which is typically swaged to terminal backplate 20. The screw 24 is then screwed into threaded hole 46 of wall mounting bracket 22 comprising a coil spring 28, which is seated in a shallow recess of collar 26, between collar 26 and the head of screw 24. Terminal 2 is removed from wall mounting bracket 22 by unscrewing screw 24. When screw 24 is no longer engaged with threaded hole 46, it "pops out" by the tension of coil spring 28. The threaded portion moves into the deep recess of collar 26. This prevents possible damage to terminal 2 or injury to the person removing the terminal 2, since there is a possible indication that the screw is free of the wall bracket 22.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result of fall within the spirit of the claimed invention. It is the intention, therefore, to limit the invention only as indicated by the scope of the claims.

What is claimed is:

1. A factory data collection terminal including a quick disconnect wall bracket for mounting said terminal on a vertical surface without removing a cover from said terminal, said terminal comprising:

terminal backplate means fastened to said terminal including a plurality of brackets with keyhold slots; and wall bracket means fastened to said vertical surface having support means for supporting the weight of said terminal and preventing said terminal from vibrating;

said terminal backplate means including captive screw means threadably engaging said wall bracket means for securely fastening said terminal backplate means to said wall bracket means and providing an indication when said terminal backplate means is free of said wall bracket means; both said terminal backplate and wall bracket means extending below said terminal.

2. The terminal of claim 1 wherein said terminal backplate means comprises:

a flat plate fastened to said terminal and including a plurality of tapped holes;

said plurality of brackets fastened to said flat plate; and said captive screw means.

3. The terminal of claim 2 wherein said captive screw means comprises:

a plurality of coil springs;

a plurality of captive screws, each having a head portion, an unthreaded portion and a threaded portion; and a plurality of collars, each having a tapped hole and permanently fastened to said flat plate so as to have said tapped hole aligned with each of a plurality of holes;

said captive screw means being assembled by placing said coil spring over said unthreaded portion so that said coil spring remains compressed between said head portion and said collar when said captive screw is screwed completely through said tapped hole so that said unthreaded portion fits loosely in said tapped hole.

4. The terminal of claim 3 wherein said wall bracket means comprises:

a wall bracket for fastening to said vertical surface and having a plurality of tapped holes for receiving said captive screw means; and said support means.

5. The terminal of claim 4 wherein said support means comprises:

a plurality of threaded studs, each fastened to said wall bracket;

a nut threaded onto each of said studs;

a lock washer placed over each of said studs;

a washer placed over each of said studs; and a stop fastened to the end of each of said studs;

said terminal being assembled to said wall bracket means wherein each of said stops are passed through a large diameter of each of said keyhole slots and said terminal positioned relative to a small diameter of each of said keyhole slots so that the said terminal is prevented from vibrating when said nuts are tightened to force each of said plurality of brackets between respective ones of said washers and said stops, each of said lock washers preventing the respective one of said nuts from loosening.

6. The terminal of claim 5 wherein each of said plurality of captive screws are screwed into respective ones of said tapped holes of said wall bracket, thereby compressing each of said plurality of coil springs between said head portions and said collar, each of said plurality of captive screws "popping out" when removing said terminal from said vertical wall indicating that each of said plurality of captive screws is disengaged from said wall bracket means.

* * * * *